March 15, 1927.

F. W. PETERS

UNIVERSAL JOINT

Filed April 22, 1925    2 Sheets-Sheet 1

1,621,218

Inventor
Frederick W. Peters,
By
Hull, Brock & West,
Attys.

March 15, 1927.  1,621,218
F. W. PETERS
UNIVERSAL JOINT
Filed April 22, 1925   2 Sheets-Sheet 2
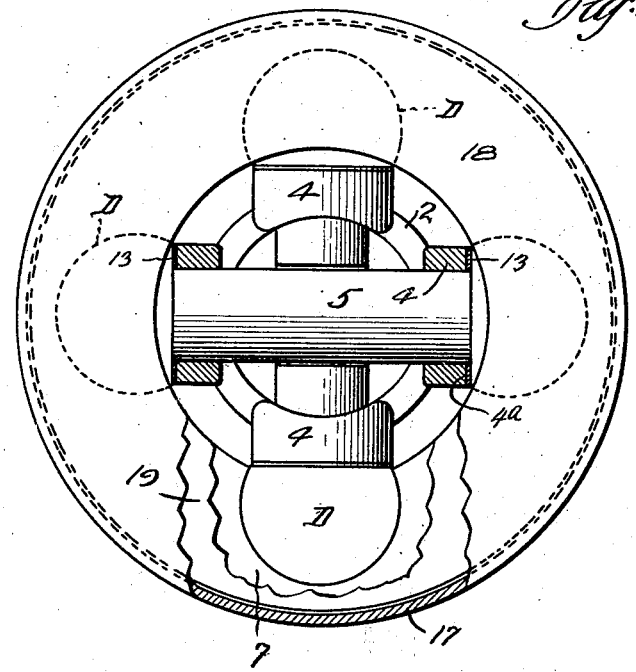
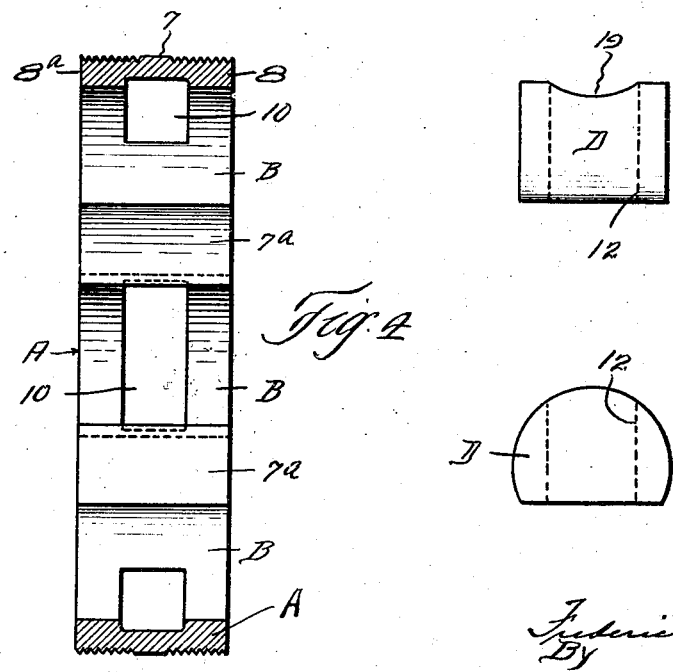
Inventor
Frederick W. Peters,
By
Hull, Brock & West.
Attys.

Patented Mar. 15, 1927.

1,621,218

UNITED STATES PATENT OFFICE.

FREDERICK W. PETERS, OF CLEVELAND, OHIO, ASSIGNOR TO SPICER MANUFACTURING CORPORATION, OF SOUTH PLAINFIELD, NEW JERSEY, A CORPORATION OF VIRGINIA.

UNIVERSAL JOINT.

Application filed April 22, 1925. Serial No. 24,927.

This invention relates to universal joints, and more particularly to joints of the character wherein the trunnions on the end coupling members are connected with an intermediate hollow lubricant-containing ring through bearing blocks which are inserted in such ring transversely of the latter—that is to say, in a direction that is substantially parallel with the axis of rotation of such ring.

A joint of this general character is shown, described, and claimed in my application 679,596, filed December 10, 1923.

It is the general purpose and object of this invention to provide a joint of the general character referred to wherein the bearing blocks may be mounted in the ring by means of seats extending laterally therethrough, while preventing the leakage of lubricant from the ends of said seats.

A further object of the invention is to provide a joint of this character which is simple in construction and cheap of production.

Figure 1:
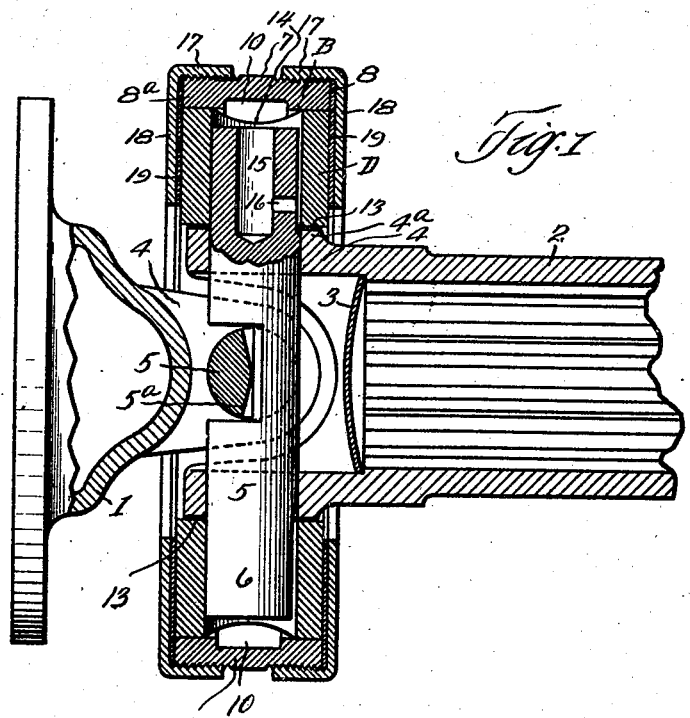
Figure 2:
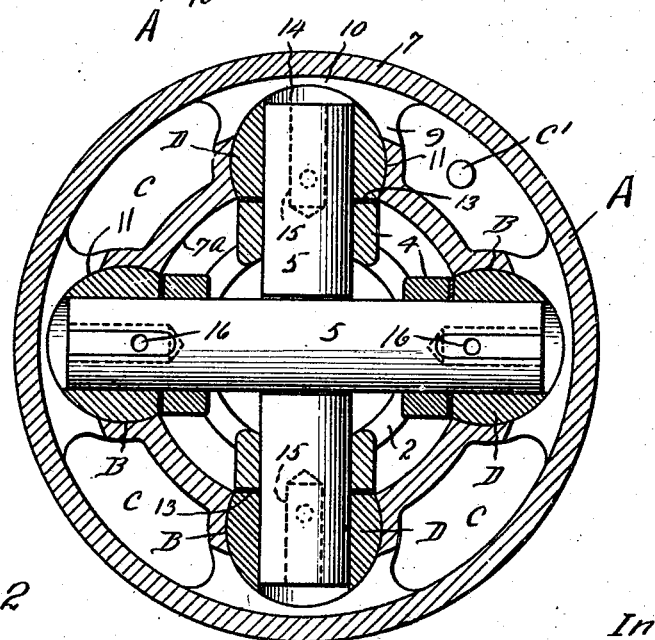

I accomplish the foregoing objects in and through the construction and arrangement of parts shown in the drawings, wherein Fig. 1 represents a sectional elevation of a universal joint embodying my invention; Fig. 2 a central sectional view through the ring showing the pins and trunnions in elevation; Fig. 3 a sectional elevation of the joint, the view being taken at the left of the connecting ring and close to the clamping ring 18; Fig. 4 a central sectional view through said ring; and Figs. 5 and 6 are views in side and end elevation, respectively, of one of the bearing blocks.

Describing the various parts by reference characters, 1 and 2 denote hubs by means of which the joint is connected to shaft sections (not shown) the hub 2 being shown as adapted for a splined connection with its shaft section, the outer end of the hub bore being closed by a plate 3. The hubs are provided each with a yoke, the arms 4 of each yoke having a cross pin 5 mounted therein, the outer ends 6 of each cross pin constituting trunnions. Each cross pin is shown as provided with a central recess $5^a$ of slightly greater depth than the radius of such pin, each recess being about 210° in angular extent to accommodate the rocking movements of the pins. The trunnions are adapted to be mounted in bearing blocks carried by and supported within a connecting member in the form of a ring, the ring being indicated generally at A. The ring is preferably made from malleable iron and is provided with an outer cylindrical wall 7, annular side walls 8 and $8^a$ and an inner cylindrical wall $7^a$, the inner wall being segmental.

Formed in the ring thus provided are transversely extending seats B for the bearing blocks. These seats extend through the side wall $8^a$ and toward and through the opposite side wall 8; and the block-receiving inner wall of each such seat is a section of a cylinder having a circumferential extent in excess of 180° whereby the seats permit the blocks to rock therein while preventing radial inward movement of the said blocks.

It will be noted that the space between the outer wall 7 and the segmental inner wall $7^a$ is divided into a plurality of chambers C, said chambers being separated from each other by means of the side walls of the seats B and by the bearing blocks inserted within such seats. Each chamber C is adapted to communicate with the interior of the seats B on each side thereof through large openings 9 formed in the walls of said seats, thereby to lubricate the outer surfaces of the bearing blocks. The chambers C are enabled to communicate with each other and to provide for the circulation of the lubricant by centrifugal action, by means of the ports 10, formed in the outer portions of the seats, said ports forming passages beyond the trunnions connecting the adjacent chambers C. The ports 10 merge at their inner ends with the openings 9. For the purpose of supplying the chambers with lubricant, one such chamber is provided with a filling opening C′ closed by a plug.

Cooperating with the seats B are the bearing blocks, each of which is indicated generally at D, the lengths of the blocks being equal to the depths of the seats and being so shaped as to fit within the said seats and each having an external wall 11 of the same general contour as the wall of its seat, except as such contour is modified by the extension of a cylindrical radial bore 12 therethrough.

Between each bearing block and the adjacent shoulder 4ᵃ on the adjacent yoke arm, and surrounding each trunnion, is a washer 13.

Each bearing block is provided with a port 14 adapted to register with the ports 10 and form therewith a continuous passage extending across the end of each trunnion and between the same and the cooperating part of the seat D, the ports 10 and 14 connecting adjacent chambers C. The ports 10 and 14 communicate with a central axial chamber 15 extending inwardly from the outer end of each trunnion, from which chamber a port 16 extends to the seat provided for each trunnion within its bearing block, the ports 16 extending at right angles to the plane of rotation of the ring, as pointed out in my earlier application referred to hereinbefore.

With the parts constructed and arranged as described the hubs, with their trunnions and the bearing blocks, can be readily applied to the ring by pressing the blocks into their seats. For the purpose of holding the blocks in their seats and of preventing leakage of lubricant around the ends of said blocks, I employ with the ring A a pair of clamping rings each having a circumferential flange 17 by means of which it is threaded upon one side of the outer cylindrical wall 7 of the connecting ring or member, and with a radially extending flange 18 which is adapted to cover the major portion of each of the blocks B, there being a gasket 19 interposed between each flange and the adjacent side face of the ring A. By setting up these clamping rings, the gaskets 19 will be forced against the faces of the ring A respectively adjacent thereto and against the outer ends of the blocks B, whereby the joints between said blocks and the seats therefor will be packed and leakage at these joints prevented.

By reason of the construction illustrated and described herein, I am enabled to provide a joint of the general character referred to hereinbefore which is simple in construction and economical of production, which will reduce to a minimum the machining operations, and which will practically eliminate the leakage of lubricant therefrom.

Having thus described my invention, what I claim is:—

1. In a universal joint, the combination, with a driving and a driven member and trunnions carried thereby, of a hollow lubricant-containing connecting ring for said trunnions, the said ring having seats extending transversely therethrough, bearing blocks for said trunnions adapted to be inserted in said seats, a clamping ring adjustably mounted upon each side of the outer face of the said ring and each such ring having a radially inwardly extending flange adapted to overhang the ends of the bearing blocks, and packing means covering the joints between the ends of said blocks and the cooperating ends of said seats and interposed between such ends and the flange on the clamping ring adjacent thereto.

2. In a universal joint, the combination, with a driving and a driven member and trunnions carried thereby, of a hollow lubricant-containing connecting ring for said trunnions, the said ring having seats extending transversely therethrough, bearing blocks for said trunnions adapted to be inserted in said seats, a clamping ring adjustably mounted upon each side of the outer face of the said ring and each such ring having a radially inwardly extending flange adapted to overhang the ends of the bearing blocks, and a gasket interposed between each flange and the adjacent outer ends of the said blocks and covering such ends and the parts of the ring therebetween.

3. In a universal joint, the combination, with a driving and a driven member and trunnions carried thereby, of a hollow lubricant-containing connecting ring for said trunnions, the said ring having seats extending transversely therethrough, bearing blocks for said trunnions adapted to be inserted in said seats from either side of said ring, and means additional to said blocks for closing the joints between the said blocks and the ends of the seats therefor, whereby leakage of lubricant is prevented.

4. In a universal joint, the combination, with a driving and a driven member and trunnions carried thereby, of a hollow lubricant-containing connecting ring for said trunnions, the said ring having seats extending transversely therethrough, bearing blocks for said trunnions adapted to be inserted in said seats, means for closing the joints between the ends of such blocks and the openings provided by said seats in one of the lateral faces of said ring, a clamping ring adjustably mounted upon the said connecting ring and having a radially inwardly extending flange adapted to overhang the other lateral face of said ring, and packing material interposed between said flange and such face of the connecting ring and covering the joints between the blocks and the openings provided therefor in such face of the connecting ring.

5. In a universal joint, the combination, with a driving and a driven member and trunnions carried thereby, of a hollow lubricant-containing connecting ring for said trunnions, the said ring having seats extending transversely therethrough and through opposite sides of said ring, bearing blocks for said trunnions insertable in said seats through the openings provided in a side of said ring, and means additional to said blocks for closing the joints between the ends thereof and the openings in the opposite sides of said ring.

6. In a universal joint, the combination, with a driving and a driven member and trunnions carried thereby, of a hollow lubricant-containing connecting ring for said trunnions, the said ring having seats extending transversely therethrough and through opposite sides of said ring, bearing blocks for said trunnions insertable in said seats through the openings provided in a side of said ring, each of said bearing blocks and the seats therefor being so shaped as to permit of a rocking movement of each block within its seat, and means additional to said blocks for closing the joints between the ends thereof and the openings in the opposite sides of said ring.

7. In a universal joint, the combination, with a driving and a driven member and trunnions carried thereby, of a hollow lubricant-containing connecting ring for said trunnions, the said ring having seats extending trasversely therethrough and through opposite sides of said ring and intersecting the inner face thereof, bearing blocks for said trunnions insertable in said seats through the openings provided in a side of said ring, each of said bearing blocks and the seats therefor being so shaped as to permit of a rocking movement of each block within its seat, each block having a radial bore for a trunnion, the bore being adapted to register with the opening formed by the intersection of its seat with the inner face of the ring, and means additional to said blocks for closing the joints between the ends thereof and the openings in the opposite sides of said ring.

In testimony whereof, I hereunto affix my signature.

FREDERICK W. PETERS.